US012614086B1

(12) United States Patent
Govindarajulu et al.

(10) Patent No.: US 12,614,086 B1
(45) Date of Patent: Apr. 28, 2026

(54) SYMBOLIC INFORMATION INCORPORATION FOR FORECASTING MODELS

(71) Applicant: Workday, Inc., Pleasanton, CA (US)

(72) Inventors: Naveen Sundar Govindarajulu, San Jose, CA (US); Arun Krishnaswamy, San Ramon, CA (US); Narayanan Krishnaswamy, Milpitas, CA (US); Ganesh Rajaratnam, Fremont, CA (US)

(73) Assignee: WORKDAY, INC., Pleasanton, CA (US)

( * ) Notice: Subject to any disclaimer, the term of this patent is extended or adjusted under 35 U.S.C. 154(b) by 1198 days.

(21) Appl. No.: 17/185,552

(22) Filed: Feb. 25, 2021

(51) Int. Cl.
| | |
|---|---|
| *G06N 5/04* | (2023.01) |
| *G06F 40/40* | (2020.01) |
| *G06N 20/00* | (2019.01) |

(52) U.S. Cl.
CPC .............. *G06N 5/04* (2013.01); *G06F 40/40* (2020.01); *G06N 20/00* (2019.01)

(58) Field of Classification Search
CPC .......... G06N 5/04; G06N 20/00; G06F 40/40; G06F 40/44; G06F 40/154; G06F 40/16; G06F 8/00; G06F 2111/05
See application file for complete search history.

(56) References Cited

U.S. PATENT DOCUMENTS

| | | | | |
|---|---|---|---|---|
| 9,881,256 B2 * | 1/2018 | Hamze | .................... | G06N 10/00 |
| 2018/0121807 A1 * | 5/2018 | Wick | ....................... | G06N 5/01 |
| 2019/0258936 A1 * | 8/2019 | Shamir | .................... | G06N 5/01 |

FOREIGN PATENT DOCUMENTS

| | | | | |
|---|---|---|---|---|
| CN | 111881979 B | * | 5/2022 | ........... G06F 9/5027 |

OTHER PUBLICATIONS

Diligenti, Michelangelo, et al. "Semantic-Based Regularization for Learning and Inference." Artificial Intelligence, vol. 244, Mar. 2017, pp. 143-165, https://doi.org/10.1016/j.artint.2015.08.011. (Year: 2015).*
Manhaeve, Robin, et al. "DeepProbLog: Neural Probabilistic Logic Programming." arXiv [Cs.AI], 2018, http://arxiv.org/abs/1805.10872. arXiv. (Year: 2018).*

(Continued)

*Primary Examiner* — Van C Mang
(74) *Attorney, Agent, or Firm* — James J. DeCarlo; Greenberg Traurig, LLP

(57) ABSTRACT

A system includes an interface and a processor. The interface is configured to receive a predicted output signal. The processor is configured to: a) determine whether the predicted output signal satisfies a constraint set; and b) in response to the predicted output signal not satisfying the constraint set, determine a transformed output signal that satisfies the constraint set by: 1) determining a set of transformed predicted output signals that satisfy the constraint set, wherein a transformed predicted output signal of the set of transformed predicted output signals that satisfy the constraint set comprises the predicted output signal modified by one or more value modifications; 2) selecting a transformed predicted output signal of the set of transformed predicted output signals that satisfy the constraint set; and 3) providing the transformed predicted output signal of the set of transformed predicted output signals that satisfy the constraint set.

20 Claims, 7 Drawing Sheets

(56)     References Cited

OTHER PUBLICATIONS

I. Perikos and I. Hatzilygeroudis, "A Case-Based Reasoning Approach to Convert Natural Language into First Order Logic," 2016 IEEE Intl Conference on Computational Science and Engineering (CSE) (Year: 2016).*

Junttila, Tommi. "The DPLL Backtracking Search Procedure—CS-E3220: Propositional Satisfiability and SAT Solvers Documentation." Users.aalto.fi, Aalto University (Year: 2020).*

Tibshirani, Ryan. "Advanced Methods for Data Analysis." Cmu. edu, Carnegie Mellon University, (Year: 2014).*

Sanchez, M., de Givry, S. & Schiex, T. "Mendelian Error Detection in Complex Pedigrees Using Weighted Constraint Satisfaction Techniques." Constraints 13, 130-154 (Year: 2008).*

Sato, Naoto, et al. "Formal Verification of a Decision-Tree Ensemble Model and Detection of Its Violation Ranges." IEICE Transactions on Information and Systems, vol. E103.D, No. 2, Institute of Electronics, Information and Communications Engineers (IEICE), Feb. 2020, pp. 363-378 (Year: 2020).*

* cited by examiner

SYMBOLIC INFORMATION INCORPORATION FOR FORECASTING MODELS

BACKGROUND OF THE INVENTION

Data processing systems receive data, store data, process data, analyze data, create reports based on data, provide processed data, etc. A common task is time series prediction. Time series prediction comprises receiving past time series data points (e.g., data from a source received at a periodic time interval) and predicting future time series data points based on the past time series data points. A forecaster comprising a model-based system can be created for time series prediction of data. The forecasting model is trained to predict future data points for time series data based on past time series data points for any data type or distribution (e.g., periodic data, nonperiodic data, power law data, exponential data, etc.). Some data processing systems include data constraints comprising rules describing the data. For example, gross sales are always higher in September than in August, or gross sales are always zero in January. These constraints are known to apply to future data, however, incorporating them into a model-based forecaster is difficult. The model-based forecaster therefore does not take the constraints into account when creating a forecast. This creates a problem wherein the forecaster is able to make a forecast that is known to be incorrect because it violates the constraints.

BRIEF DESCRIPTION OF THE DRAWINGS

Various embodiments of the invention are disclosed in the following detailed description and the accompanying drawings.

DETAILED DESCRIPTION

Figure 1:
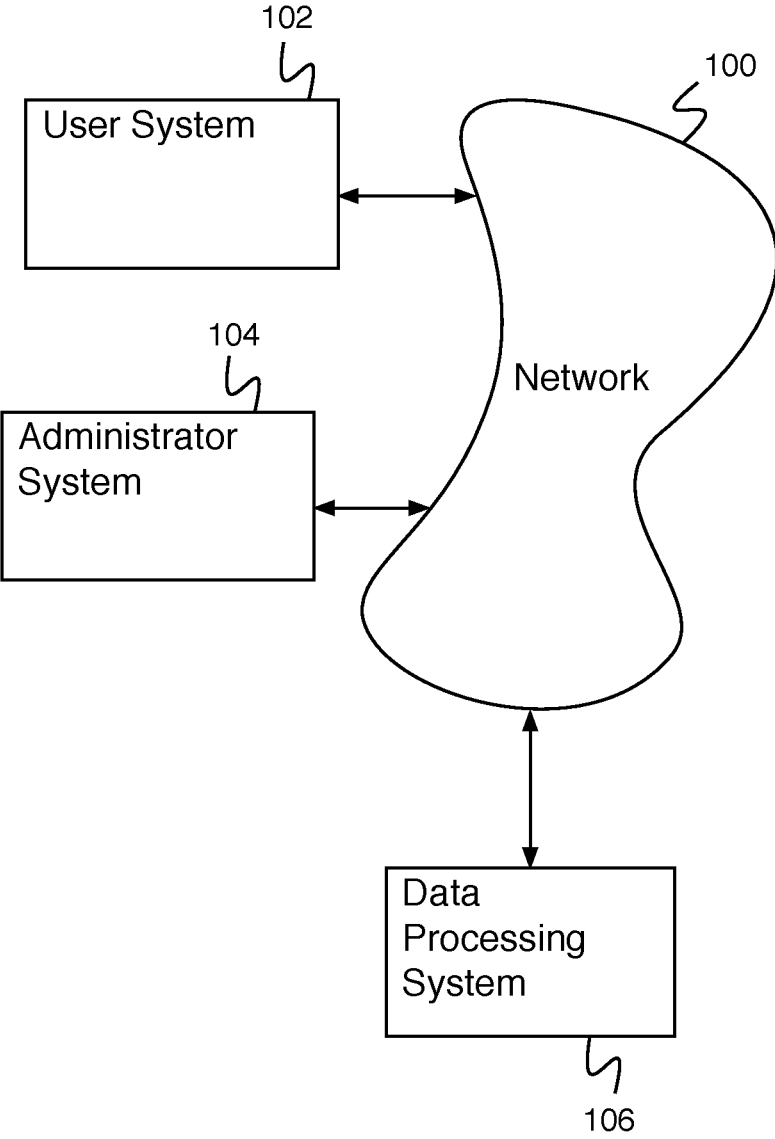
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention.

Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system comprises an input interface configured to receive a predicted output signal, a processor configured to determine whether the predicted output signal satisfies a constraint set, in response to the predicted output signal not satisfying the constraint set, determine a transformed output signal that satisfies the constraint set by determining a set of transformed predicted output signals that satisfy the constraint set, wherein a transformed predicted output signal of the set of transformed predicted output signals that satisfy the constraint set comprises the predicted output signal modified by one or more value modifications, determining a transformed predicted output signal of the set of transformed predicted output signals that satisfy the constraint set, and providing the transformed predicted output signal of the set of transformed predicted output signals that satisfy the constraint set, and a memory coupled to the processor and configured to provide the processor with instructions.

A system for symbolic information incorporation for forecasting systems comprises a system for extending a forecasting model to include constraints. A data system includes a set of constraints on valid time based data—for example, constraints on a value of a data point at a time, constraints on relative values of data points at different times, constraints on a data pattern, etc. The data system additionally comprises a base forecasting model—for example, a model for forecasting data points in the future based on data points in the past. The forecasting model comprises a model-based forecasting model (e.g., a machine learning based forecasting model, a neural network based forecasting model, an artificial intelligence based forecasting model, etc.). Incorporating the constraints into the base forecasting model is difficult, as the model upon which the base forecasting model is based cannot be modified directly. A forecast is created that meets the constraints by creating a forecast using the base forecasting model and, in the event the forecast does not meet the constraints, modifying it to meet the constraints. For example, a selected data point of the forecast is modified to one of a set of modified values. Or, for another example, each data point of the forecast is selected in turn and modified to one of a set of modified values. Each time a data point is modified, the new signal is checked to determine whether it satisfies the constraints. In the event the new signal meets the constraints it is added to a set of signals that meet the constraints. After the data point modifications are checked, a signal of the set of signals that meet the constraints is selected. For example, the signal of the set of signals that meet the constraints is selected based at least in part on a computed distance from the forecast created by the base forecasting model. In some embodiments, the signal of the set of signals that meet the constraints is selected using a model for determining the signal most similar to the forecast created by the base forecasting model. The selected signal of the set of signals that meet the constraints is then provided as the prediction. In some embodiments, a set of signals that meet the constraints are provided in a ranked order allowing the user to select the signal, where the ranking is based on the distance to the forecast signal or can be determined by another model. In some embodiments, modifications to multiple data points at a time are tested—for example, by selecting a set of data points of the forecast to modify, selecting a set of new values for the set of data points, modifying the set of data points using the set of new values using the set of data points, and determining whether the modified signal meets the constraints. Testing is repeated using different sets of new values for the set of data points and different sets of data points of the forecast to modify.

In some embodiments, efficiency is improved using a generalized binary search method for determining a data point to modify. The generalized binary search takes advantage of the fact that if a signal meets the constraints then all sub-portions of the signal also meet the constraints. The forecast from the base forecasting model is initially checked to determine whether it meets the constraints. In the event that the forecast does not meet the constraints, it is separated into two sub-portions. For example, the first half of the time points comprise one sub-portion and the second half of the time points comprise another sub-portion. Each sub-portion is checked to determine whether it meets the constraints. In the event that only one sub-portion is determined to not meet the constraints, it is known that the data points of the sub-portion determined to meet the constraints do not need to be modified. The points of the sub-portion that does not meet the constraints is then checked, either by checking each data point of the sub-portion to determine whether modifying the data point causes the signal to meet the constraints, or by recursively dividing the sub-portion into sub-portions and repeating the process.

The system for symbolic information incorporation for forecasting systems improves the computer by creating a forecast of future data based on past data using a generic base forecasting model that is guaranteed to meet a set of externally defined constraints. In the event that the base forecasting model is improved to a new model, the new model can be incorporated into the system for symbolic information incorporation for forecasting systems with few modifications. Similarly, new constraints for the forecast can be easily added to the system for symbolic information incorporation for forecasting systems.

FIG. 1 is a block diagram illustrating an embodiment of a network system. In some embodiments, the network system of FIG. 1 comprises a network system for a system for predicting data. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, and data processing system 106 communicate via network 100.

User system 102 comprises a user system for use by a user. For example, user system 102 comprises a system for communication, data access, computation, etc. A user uses user system 102 to access data processing system 106. For example, a user uses user system 102 to access data on data processing system 106, a user uses user system 102 to add data to data processing system 106, a user uses user system 102 to modify data on data processing system 106, a user uses user system 102 to delete data on data processing system 106, a user uses user system 102 to request data processing on data processing system 106, etc. Administrator system 104 comprises an administrator system for use by an administrator. For example, administrator system 104 comprises a system for communication, data access, computation, etc. An administrator uses administrator system 104 to maintain data processing system 106. For example, an administrator uses administrator system 104 to start and/or stop services on data processing system 106, to reboot data processing system 106, to install software on data processing system 106, to add, modify, and/or remove data on data processing system 106, etc.

Data processing system 106 comprises a database system for storing data. For example, database system 106 comprises a business database system, a human resources database system, a financial database system, a university database system, a medical database system, a manufacturing database system, etc. For example, database system 106 comprises a system for receiving time-based data, processing time-based data, making predictions of future values of time-based data, determining component analyses of predictions of future values of time-based data, etc.

For example, data processing system 106 comprises an interface configured to receive a predicted output signal, a processor configured to determine whether the predicted output signal satisfies a constraint set, in response to the predicted output signal not satisfying the constraint set, determine a transformed output signal that satisfies the constraint set by determining a set of transformed predicted output signals that satisfy the constraint set, wherein a transformed predicted output signal of the set of transformed predicted output signals that satisfy the constraint set comprises the predicted output signal modified by one or more value modifications, determining a transformed predicted output signal of the set of transformed predicted output signals that satisfy the constraint set, and providing the transformed predicted output signal of the set of transformed predicted output signals that satisfy the constraint set, and a memory coupled to the processor and configured to provide the processor with instructions.

Figure 2:
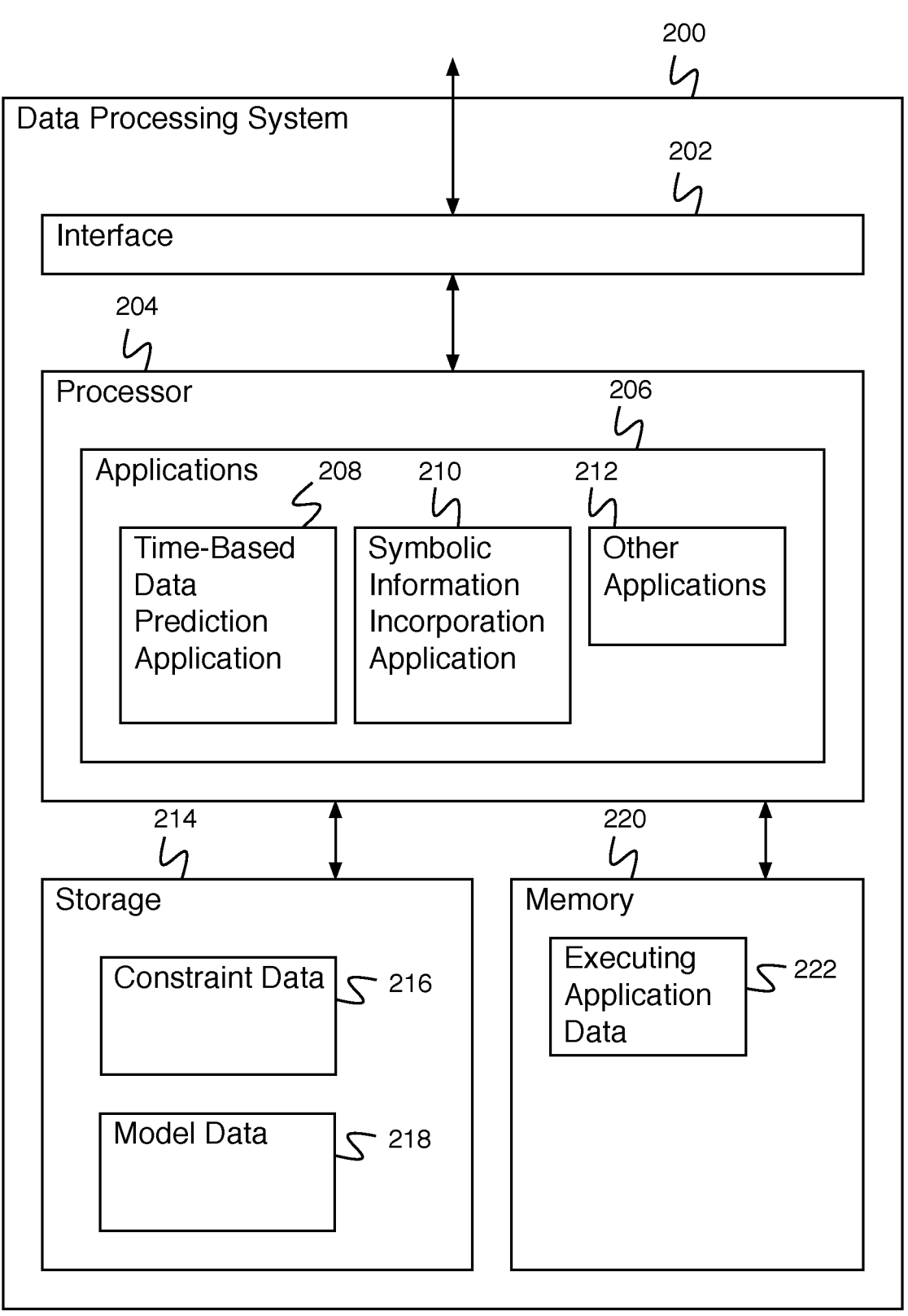
FIG. 2 is a block diagram illustrating an embodiment of a data processing system.

FIG. 2 is a block diagram illustrating an embodiment of a data processing system. In some embodiments, data processing system 200 comprises data processing system 106 of FIG. 1. In the example shown, data processing system 200 comprises interface 202. For example, interface 202 comprises an interface for receiving data, providing data, receiving data processing parameters, receiving a request to execute data processing, etc. Processor 204 comprises a processor for executing applications 206. Applications 206 comprises time-based data prediction application 208, symbolic information incorporation application 210, and other applications 212. Time-based data prediction application 208 comprises an application for predicting time based data, for example, using a machine learning model, using an artificial intelligence system, etc. Symbolic information incorporation application 210 comprises an application for incorporating constraints (e.g., constraints represented as symbolic information) into a prediction received from time-based data prediction application 208. Symbolic information incorporation application 210 provides a new prediction that meets the constraints. For example, symbolic information incorporation application 210 is configured to determine whether a predicted output signal satisfies a constraint set, in response to the predicted output signal not satisfying the constraint set, determine a transformed output signal that satisfies the constraint set by determining a set of transformed predicted output signals that satisfy the constraint set, wherein a transformed predicted output signal of the set of transformed predicted output signals that satisfy the constraint set comprises the predicted output signal modified by one or more value modifications, determining a transformed predicted output signal of the set of transformed predicted output signals that satisfy the constraint set, and providing the transformed predicted output signal of the set of transformed predicted output signals that satisfy the constraint set, and a memory coupled to the processor and configured to provide the processor with instructions. Other applications 212 comprises any other appropriate applications (e.g., a data storage and retrieval application, a communications application, a chat application, a web browser application, a document preparation application, a report preparation application, a user interface application, a data analysis application, etc.). Storage 214 comprises constraint data 216 (e.g., constraint data utilized by symbolic information incorporation application 210), model data 218 (e.g., model data describing one or more machine learning models, forecasting model data, component analysis model data, etc.). Memory 220 comprises executing application data 222 comprising data associated with applications 206.

Figure 3:
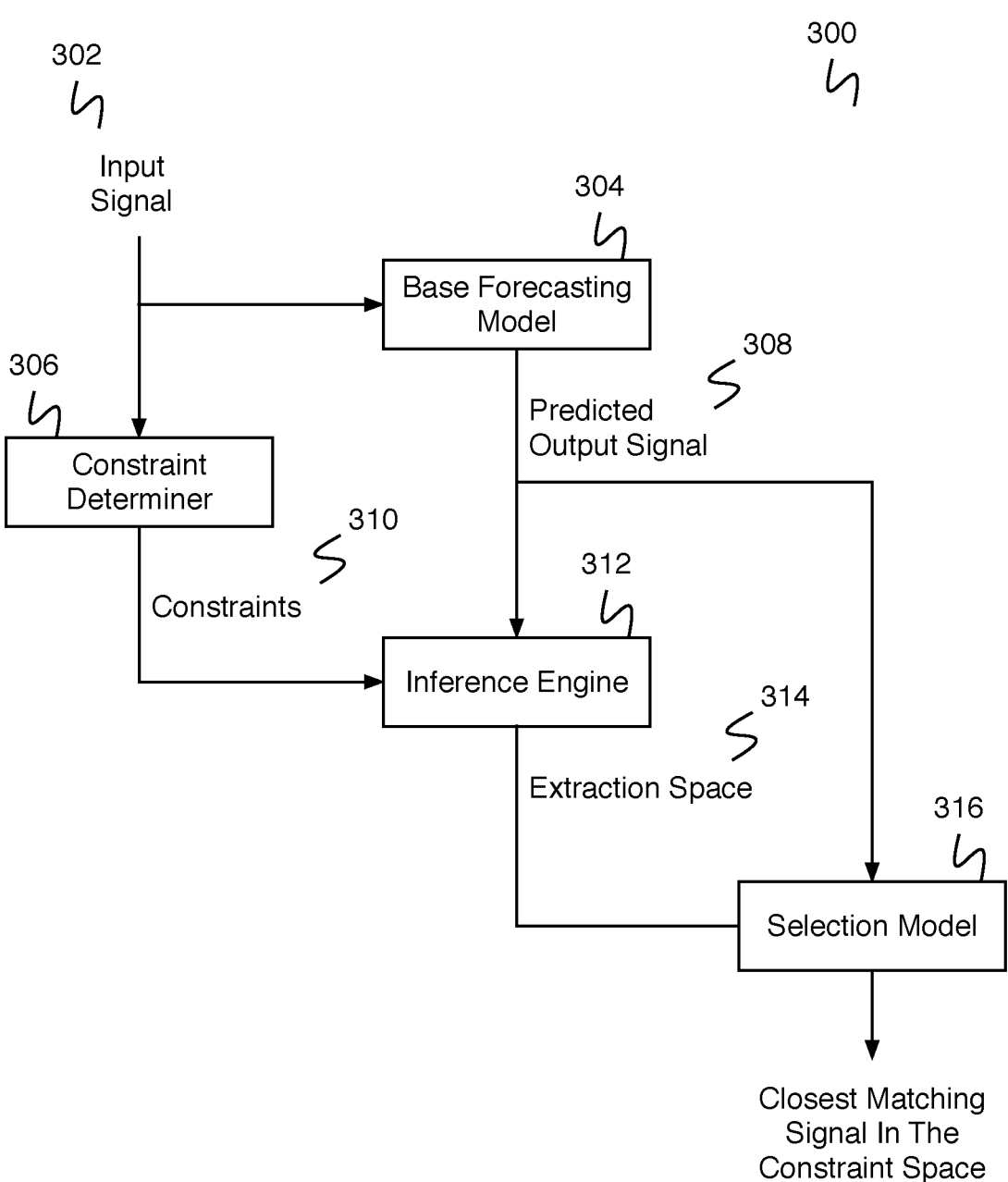
FIG. 3 is a diagram illustrating an embodiment of a system for symbolic information incorporation for forecasting systems.

FIG. 3 is a diagram illustrating an embodiment of a system for symbolic information incorporation for forecasting systems. In some embodiments, system 300 executes on data processing system 106 of FIG. 1. In the example shown, input signal 302 is received by base forecasting model 304 and constraint determiner 306. Base forecasting model 304 comprises a model for forecasting future data points of a data signal based at least in part on previous data points. For example, base forecasting model comprises a machine learning model, a neural network model, a rule-based model, a statistical model, an autoregressive model, an ensemble model, or any other appropriate model. Base forecasting model 304 produces predicted output signal 308. Constraint determiner 306 comprises a system for determining constraints 310. For example, constraints comprise restrictions on data point values, restrictions on data point relationships, restrictions on data point patterns, etc. Constraints are represented in first order logic formulae, probabilistic formulae, Markov logic, horn clauses, resource description framework (RDF) constraints (e.g., shapes constraint language (SHACL) is an example of an implementation of constraints on top of RDF), etc. In some embodiments, constraint determiner 306 determines constraints using a machine learning system, an artificial intelligence system, a natural language processing system, etc. In some embodiments, constraints determined by constraint determiner 306 are based at least in part on input signal 302. Inference engine 312 receives predicted output signal 308 and constraints 310. Inference engine 312 determines extraction space 314 comprising a set of signals that satisfy constraints 310. For example, signals of extraction space 314 comprise predicted output signal 308 having undergone one or more modifications in order to satisfy constraints 310. For example, inference engine 312 is configured to determine whether the predicted output signal satisfies the constraint set, and in response to the predicted output signal not satisfying the constraint set, determine a set of transformed predicted output signals that satisfy the constraint set, wherein a transformed predicted output signal of the set of transformed predicted output signals that satisfy the constraint set comprises the predicted output signal modified by one or more value modifications. Selection model 316 receives predicted output signal 308 and extraction space 314. Selection model 316 determines a signal of extraction space 314—for example, the closest signal to predicted output signal 308. For example, selection model 316 determines the closest matching signal in the constraint space by determining a distance to predicted output signal 308, using a machine learning model, a neural network model, a rule-based model, a statistical model, an ensemble model, dynamic time warping, etc. For example, selection model 316 determines a closest transformed predicted output signal of the set of transformed predicted output signals that satisfy the constraint set and provides the closest transformed predicted output signal of the set of transformed predicted output signals that satisfy the constraint set. In some embodiments, a ranking of signals is provided that meet the constraints allowing the user to select the signal, where the ranking is based on the distance to the forecast signal or can be determined by another model.

Figure 4:
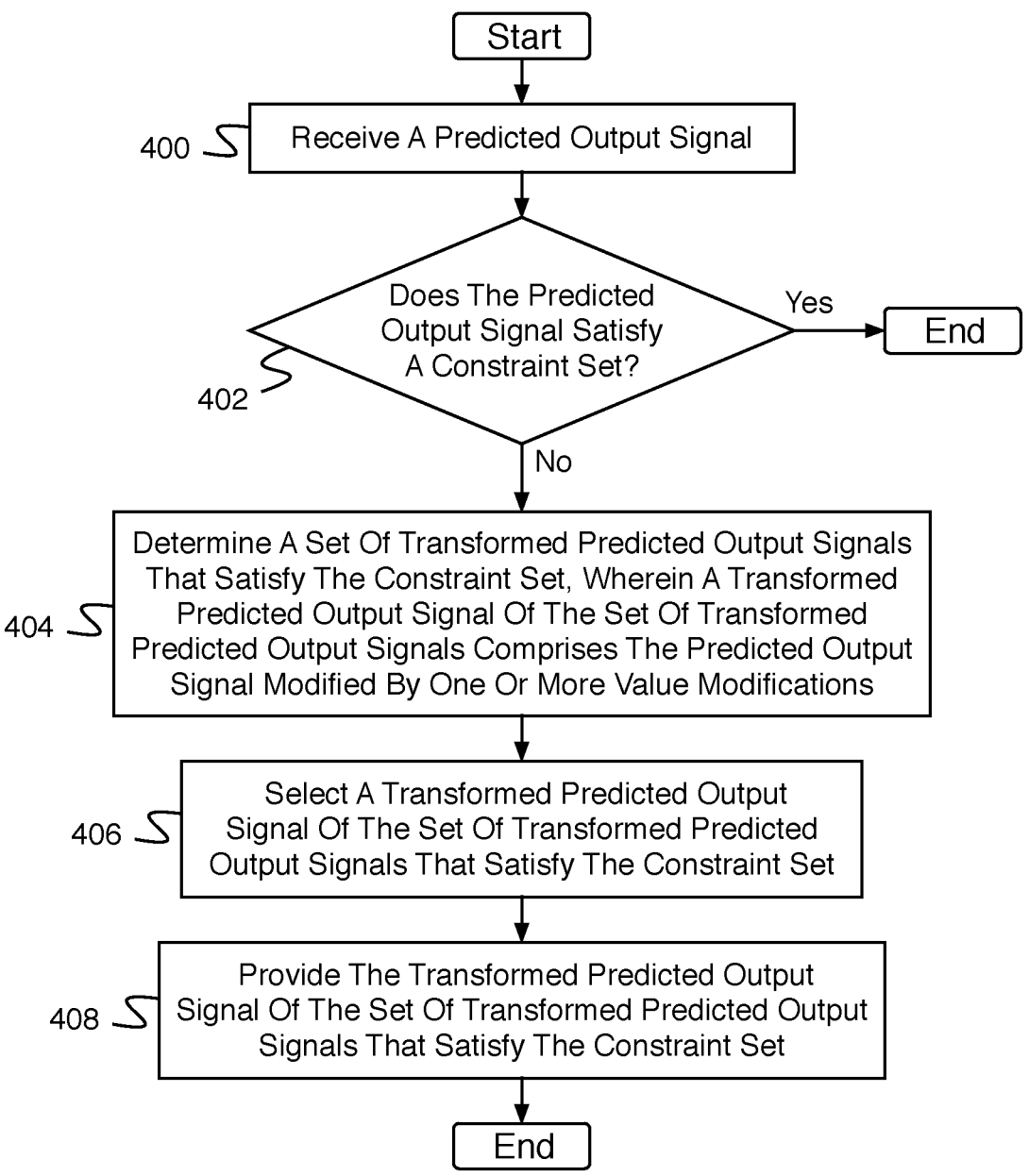
FIG. 4 is a flow diagram illustrating an embodiment of a process for symbolic information incorporation for forecasting systems.

FIG. 4 is a flow diagram illustrating an embodiment of a process for symbolic information incorporation for forecasting systems. In some embodiments, the process of FIG. 4 is executed by data processing system 106 of FIG. 1. In the example shown, in 400, a predicted output signal is received. For example, the predicted output signal is received from a base forecasting model. In 402, it is determined whether the predicted output signal satisfies a constraint set. For example, determining whether the predicted output signal satisfies the constraint set comprises using a first-order prover, a satisfiability (e.g., SAT) solver, or a satisfiability modulo theory (e.g., SMT) solver. In various embodiments, the constraints are represented in first order logic formulae, probabilistic first order logic formulae, Markov logic, horn clauses, RDF constraints (e.g., shapes constraint language (SHACL) is an example of an implementation of constraints on top of RDF), or any other appropriate representation of constraints. In some embodiments, the constraints are created using a machine learning system—for example, the constraints are created by analyzing a textual description of constraints using a natural language processing system. In the event it is determined that the predicted output signal satisfies the constraint set, the process ends. In the event it is determined that the predicted output signal does not satisfy the constraint set, control passes to 404. In 404, a set of transformed predicted output signals that satisfy the constraint set is determined, wherein a transformed predicted output signal of the set of transformed predicted output signals comprises the predicted output signal modified by one or more value modifications. For example, the transformed predicted output signal of the set of transformed predicted output signals that satisfy the constraint set is associated with a satisfaction value (e.g., a satisfaction value indicating how well the constraints are satisfied—for example, based at least in part on associated probabilities, strengths, uncertainties, confidence intervals, etc.). In some embodiments, the process is further configured to rank the set of transformed predicted output signals that satisfy the constraint set by satisfaction value. In 406, a transformed predicted output signal of the set of transformed predicted output signals that satisfy the constraint set is selected. For example, the closest transformed predicted output signal of the set of transformed predicted output signals is selected using a machine learning model. In 408, the transformed output signal of the set of transformed predicted output signals that satisfy the constraint set is provided. In some embodiments, a ranking of signals is provided that meet the constraints allowing the user to select the signal, where the ranking is based on the distance to the forecast signal or can be determined by another model.

Figure 5:
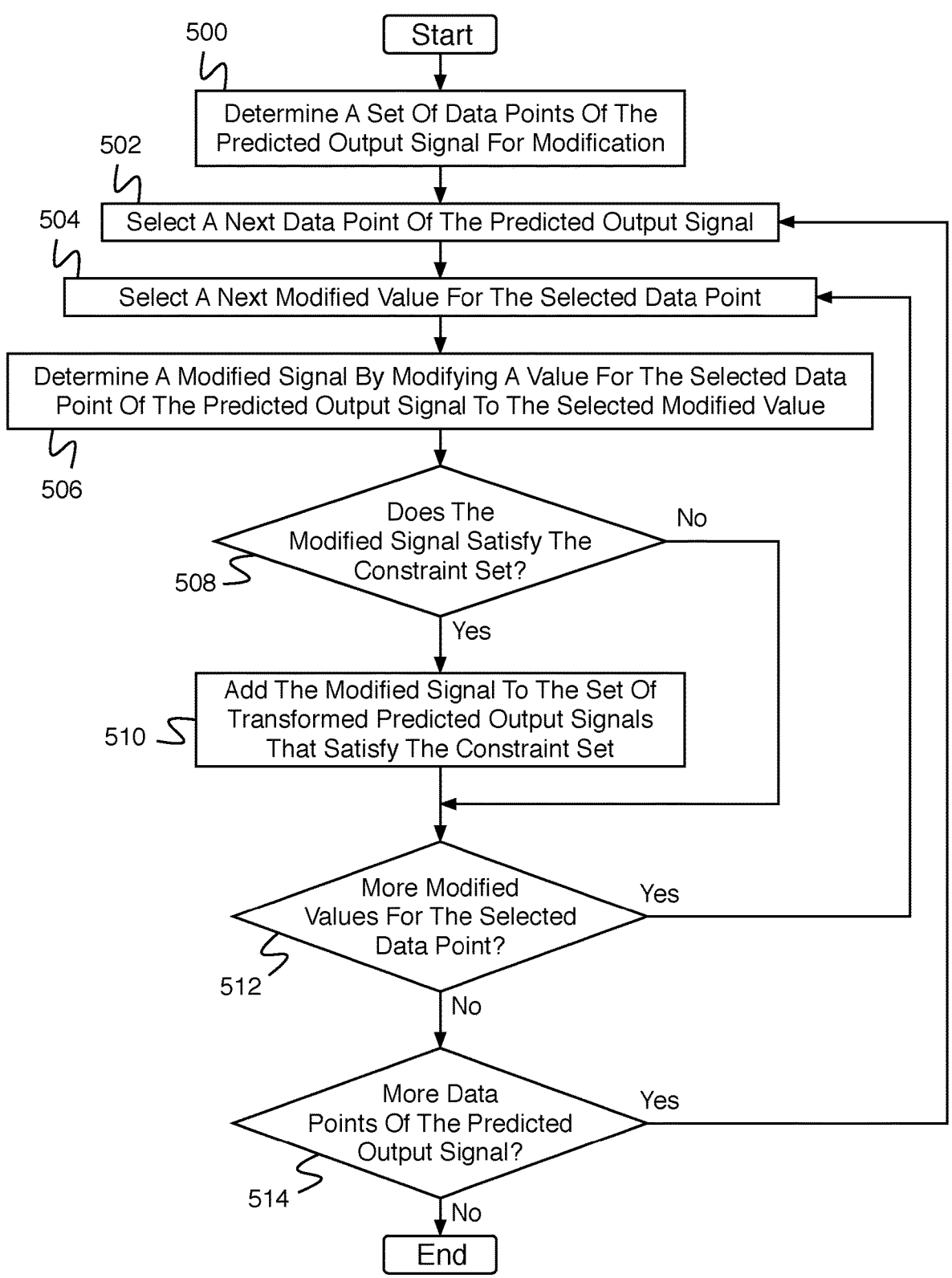
FIG. 5 is a flow diagram illustrating an embodiment of a process for determining a set of transformed predicted output signals that satisfy a constraint set.

FIG. 5 is a flow diagram illustrating an embodiment of a process for determining a set of transformed predicted output signals that satisfy a constraint set. In some embodiments, the process of FIG. 5 implements 404 of FIG. 4. In the example shown, the process of FIG. 5 comprises a process for determining a set of transformed predicted output signals that satisfy a constraint set by changing a single data point. In the example shown, in 500, a set of data points of the predicted output signal for modification is determined. For example, the set of data points comprises all future data points of the predicted output signal or a subset of the future data points of the predicted output signal. In 502, a next data point of the predicted output signal is selected. For example, a next data point of the predicted output signal comprises a point of the set of data points of the predicted output signal for modification. In 504, a next modified value for the selected data point is selected. In 506, a modified signal is determined by modifying a value for the selected data point of the predicted output signal to the selected modified value. In 508, it is determined whether the modified signal satisfies the constraint set. In the event it is determined that the modified signal does not satisfy the constraint set, control passes to 512. In the event it is determined that the modified signal satisfies the constraint set, control passes to 510. In 510, the modified signal is added to the set of transformed predicted output signals that satisfy the constraint set. In 512, it is determined whether there are more modified values for the selected data point. For example, all values within a predetermined range are tested. In the event it is determined that there are more modified values for the selected data point, control passes to 504.

For example, repeatedly selecting a next modified value for the selected data point and modifying the value for the selected data point to the next modified value comprises determining a plurality of modified signals by selecting a data point of the predicted output signal and modifying the value for the data point to a plurality of different values. In the event it is determined that there are not more modified values for the selected data point, control passes to 514. In 514, it is determined whether there are more data points of the predicted output signal. For example, it is determined whether there are more data points of the predicted output signal for modification that have not yet been modified. In the event it is determined that there are more data points of the predicted output signal, control passes to 502. For example, repeatedly selecting a next data point of the predicted output signal and modifying the value for the selected data point comprises determining a plurality of modified signals by selecting a plurality of data points of the predicted output signal and modifying the value for each data point of the plurality of data points. In the event it is determined that there are not more data points of the predicted output signal, the process ends.

Figure 6:
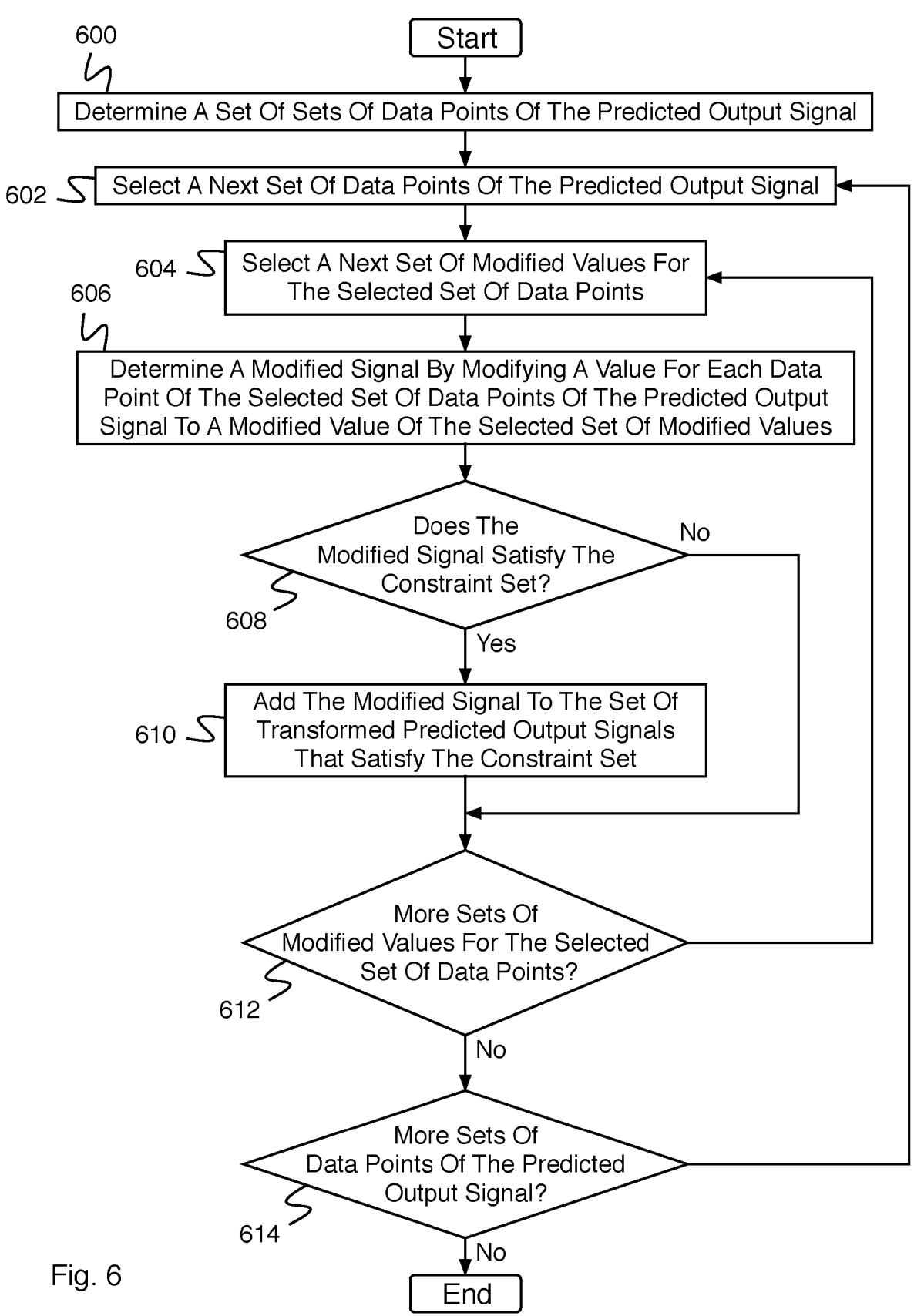
FIG. 6 is a flow diagram illustrating an embodiment of a process for determining a set of transformed predicted output signals that satisfy a constraint set.

FIG. 6 is a flow diagram illustrating an embodiment of a process for determining a set of transformed predicted output signals that satisfy a constraint set. In some embodiments, the process of FIG. 6 implements 404 of FIG. 4. In the example shown, the process of FIG. 6 comprises a process for determining a set of transformed predicted output signals that satisfy a constraint set by changing multiple data points. In 600, a set of sets of data points of the predicted output signal is determined. For example, the set of sets of data points comprises sets of two data points, sets of three data points, sets of four data points, etc. In 602, a next set of data points of the predicted output signal is selected. In 604, a next set of modified values for the selected set of data points is determined. In 606, a modified signal is determined by modifying a value for each data point of the selected set of data points of the predicted output signal to a modified value of the selected set of modified values. In 608, it is determined whether the modified signal satisfies the constraint set. In the event it is determined that the modified signal does not satisfy the constraint set, control passes to 612. In the event it is determined that the modified signal satisfies the constraint set, control passes to 610. In 610, the modified signal is added to the set of transformed predicted output signals that satisfy the constraint set. In 612, it is determined whether there are more sets of modified values for the selected set of data points. For example, all combinations of all values within a predetermined range are tested. In the event it is determined that there are more sets of modified values for the selected set of data points, control passes to 604.

For example, repeatedly selecting a next set of modified values for the selected set of data points and modifying the value for each data point of the selected set of data points to a modified value of the next set of modified values comprises determining a plurality of modified signals by modifying values for each data point of the selected set of data points to a plurality of different values. In the event it is determined that there are not more sets of modified values for the selected set of data points, control passes to 614. In 614, it is determined whether there are more sets of data points of the predicted output signal. In the event it is determined that there are more sets of data points of the predicted output signal, control passes to 602. For example, repeatedly selecting a next set of data points of the predicted output signal and modifying the value for each data point of the selected set of data points to a modified value comprises determining a plurality of modified signals by modifying values for a plurality of sets of data points of the predicted output signal. In the event it is determined that there are not more sets of data points of the predicted output signal, the process ends.

Figure 7:
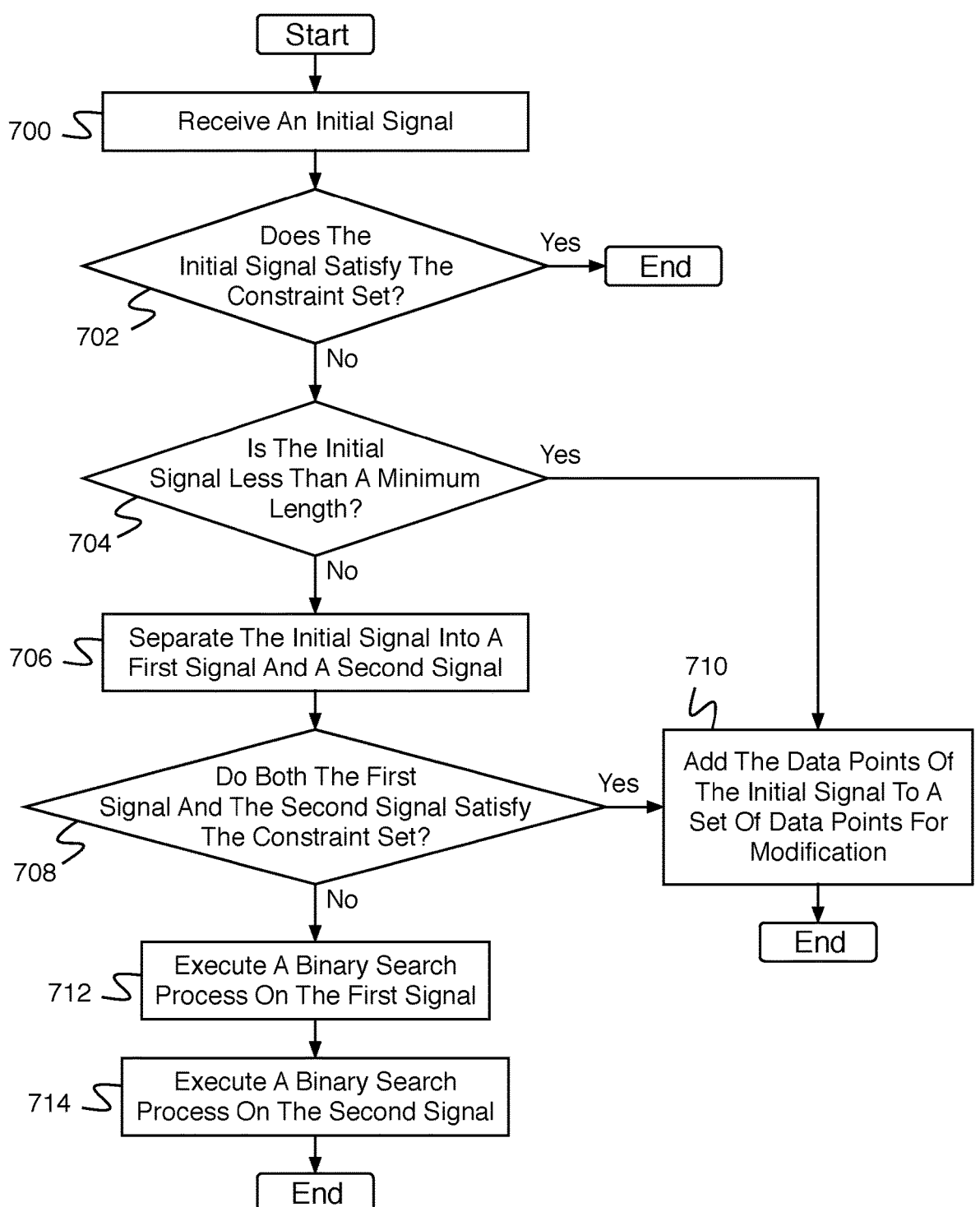
FIG. 7 is a flow diagram illustrating an embodiment of a process for determining a set of data points of a predicted output signal for modification.

FIG. 7 is a flow diagram illustrating an embodiment of a process for determining a set of data points of a predicted output signal for modification. In some embodiments, the process of FIG. 7 implements 500 of FIG. 5. For example, the process of FIG. 7 determines a set of data points of a predicted output signal for modification using a generalized binary search technique. In the example shown, in 700, an initial signal is received. For example, the initial signal comprises a signal for determining a set of data points for modification. In 702, it is determined whether the initial signal satisfies the constraint set. In the event it is determined that the initial signal satisfies the constraint set, the process ends. In the event it is determined that the initial signal does not satisfy the constraint set, control passes to 704. In 704, it is determined whether the initial signal is less than a minimum length. For example, a generalized binary search technique is only used for signals of greater than the minimum length. In the event it is determined in 704 that the initial signal is less than the minimum length, control passes to 710. In the event it is determined in 704 that the initial signal is not less than the minimum length, control passes to 706. In 706, the initial signal is separated into a first signal and a second signal. For example, the initial signal is separated into a first approximate half and a second approximate half. In 708, it is determined whether both the first signal and the second signal satisfy the constraint set. For example, in the event that both the first signal and the second signal satisfy the constraint set, the constraint violation of the initial signal results from the complete signal and will not be found by the generalized binary search. In some embodiments, in the event that both the first signal and the second signal satisfy the constraint set, control passes to 706 to try a different separation of the initial signal into a first signal and a second signal. In the example shown, in the event that both the first signal and the second signal satisfy the constraint set, control passes to 710. In 710, the data points of the initial signal are added to a set of data points for modification, and the process ends. In the event it is determined in 708 that it is not the case that both the first signal and the second signal satisfy the constraint set, control passes to 712. In 712, a generalized binary search process is executed on the first signal. For example, the process of FIG. 7 is used to execute a generalized binary search process on the first signal. In 714, a generalized binary search process is executed on the second signal. For example, the process of FIG. 7 is used to execute a generalized binary search process on the second signal.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

an input interface configured to:

receive a predicted output signal from a base forecasting model comprising a machine learning model trained on historical time series data;

a processor configured to:

determine whether the predicted output signal satisfies a constraint set, the constraint set comprising a set of formal logical expressions that define relationships and interdependencies between multiple data points in the predicted output signal; and in response to the predicted output signal not satisfying the constraint set, determine a transformed output signal that satisfies the constraint set by:

determining a set of transformed predicted output signals that satisfy the constraint set, wherein a transformed predicted output signal of the set of transformed predicted output signals that satisfy the constraint set comprises the predicted output signal modified by one or more value modifications using an inference engine that simultaneously modifies multiple interdependent data points in the predicted output signal to satisfy constraints according to a heuristic algorithm that navigates a search space of possible transformations to satisfy the constraints;

selecting a transformed predicted output signal of the set of transformed predicted output signals that satisfy the constraint set using a selection model that determines a closest matching signal to the predicted output signal while satisfying the constraint set by computing a quantitative distance metric between the transformed predicted output signal and the predicted output signal; and providing the transformed predicted output signal of the set of transformed predicted output signals that satisfy the constraint set, the transformed predicted output signal subsequently used as additional training data to iteratively improve future forecasting performance of the machine learning model;

generating a new training dataset by incorporating the transformed predicted output signal as additional training data with the historical time series data;

re-training the machine learning model using the new training dataset to generate an improved base forecasting model, wherein the re-training comprises providing the transformed predicted output signal and the constraint set as training inputs to the machine learning model, using the transformed predicted output signal that satisfies the constraint set as training data for future predictions and modifying the base forecasting model to incorporate patterns from the transformed predicted output signal such that subsequent predicted output signals generated by the improved base forecasting model exhibit constraint satisfaction patterns learned from the transformed predicted output signal; and a memory coupled to the processor and configured to provide the processor with instructions.

2. The system of claim 1, wherein determining a transformed predicted output signal of the set of transformed predicted output signals that satisfy the constraint set comprises:

determining a modified signal by modifying a value for a data point of the predicted output signal to a modified value; and in response to the modified signal satisfying the constraint set, adding the modified signal to the set of transformed predicted output signals that satisfy the constraint set.

3. The system of claim 2, wherein a plurality of modified signals comprising the modified signal is determined by selecting a plurality of data points of the predicted output signal and modifying the value for each data point of the plurality of data points.

4. The system of claim 2, wherein a plurality of modified signals comprising the modified signal is determined by selecting a data point of the predicted output signal and modifying the value for the data point to a plurality of different values.

5. The system of claim 2, wherein the data point of the predicted output signal is selected using a generalized binary search.

6. The system of claim 5, wherein using the generalized binary search comprises repeatedly separating a signal that does not satisfy the constraint set into a first signal and a second signal, determining whether the first signal satisfies the constraint set, and determining whether the second signal satisfies the constraint set, wherein an initial signal comprises the predicted output signal.

7. The system of claim 1, wherein determining a transformed predicted output signal of the set of transformed predicted output signals that satisfy the constraint set comprises:

determining a modified signal by modifying a value for each data point of a set of data points of the predicted output signal to a modified value of a set of modified values; and in response to the modified signal satisfying the constraint set, adding the modified signal to the set of transformed predicted output signals that satisfy the constraint set.

8. The system of claim 7, wherein a plurality of modified signals comprising the modified signal is determined by modifying values for a plurality of sets of data points of the predicted output signal.

9. The system of claim 7, wherein a plurality of modified signals comprising the modified signal is determined by modifying the value for a selected data point of the set of data points to a plurality of different values.

10. The system of claim 7, wherein a plurality of modified signals comprising the modified signal is determined by modifying the value for each data point of the set of data points to a plurality of different values.

11. The system of claim 1, wherein the transformed predicted output signal is selected using a machine learning model.

12. The system of claim 1, wherein determining whether the predicted output signal satisfies the constraint set comprises using a first-order prover, a SAT solver, or a SMT solver.

13. The system of claim 1, wherein the transformed predicted output signal of the set of transformed predicted output signals that satisfy the constraint set is associated with a satisfaction value.

14. The system of claim 13, wherein the processor is further configured to rank the set of transformed predicted output signals that satisfy the constraint set by satisfaction value.

15. The system of claim 1, wherein the constraints are represented in first order logic formulae, probabilistic first order logic formulae, Markov logic, horn clauses, or RDF.

16. The system of claim 1, wherein the constraints are created using a machine learning system.

17. The system of claim 16, wherein the machine learning system comprises a natural language processing system.

18. A method, comprising:
    receiving a predicted output signal from a base forecasting model comprising a machine learning model trained on historical time series data;
    determining, using a processor, whether the predicted output signal satisfies a constraint set, the constraint set comprising a set of formal logical expressions that define relationships and interdependencies between multiple data points in the predicted output signal;
    in response to the predicted output signal not satisfying the constraint set, determining a transformed output signal that satisfies the constraint set by:
    determining a set of transformed predicted output signals that satisfy the constraint set, wherein a transformed predicted output signal of the set of transformed predicted output signals that satisfy the constraint set comprises the predicted output signal modified by one or more value modifications using an inference engine that simultaneously modifies multiple interdependent data points in the predicted output signal to satisfy constraints according to a heuristic algorithm that navigates a search space of possible transformations to satisfy the constraints;
    selecting a transformed predicted output signal of the set of transformed predicted output signals that satisfy the constraint set using a selection model that determines a closest matching signal to the predicted output signal while satisfying the the constraint set by computing a quantitative distance metric between the transformed predicted output signal and the predicted output signal;

providing the transformed predicted output signal of the set of transformed predicted output signals that satisfy the constraint set, the transformed predicted output signal subsequently used as additional training data to iteratively improve future forecasting performance of the machine learning model;
    generating a new training dataset by incorporating the transformed predicted output signal as additional training data with the historical time series data; and
    re-training the machine learning model using the new training dataset to generate an improved base forecasting model, wherein the re-training comprises providing the transformed predicted output signal and the constraint set as training inputs to the machine learning model, using the transformed predicted output signal that satisfies the constraint set as training data for future predictions and modifying the base forecasting model to incorporate patterns from the transformed predicted output signal such that subsequent predicted output signals generated by the improved base forecasting model exhibit constraint satisfaction patterns learned from the transformed predicted output signal.

19. A computer program product embodied in a non-transitory computer readable medium and comprising computer instructions for:
    receiving a predicted output signal from a base forecasting model comprising a machine learning model trained on historical time series data;
    determining whether the predicted output signal satisfies a constraint set, the constraint set comprising a set of formal logical expressions that define relationships and interdependencies between multiple data points in the predicted output signal;
    in response to the predicted output signal not satisfying the constraint set, determining a transformed output signal that satisfies the constraint set by:
    determining a set of transformed predicted output signals that satisfy the constraint set, wherein a transformed predicted output signal of the set of transformed predicted output signals that satisfy the constraint set comprises the predicted output signal modified by one or more value modifications using an inference engine that simultaneously modifies multiple interdependent data points in the predicted output signal to satisfy constraints according to a heuristic algorithm that navigates a search space of possible transformations to satisfy the constraints;
    selecting a transformed predicted output signal of the set of transformed predicted output signals that satisfy the constraint set using a selection model that determines a closest matching signal to the predicted output signal while satisfying the constraints by computing a quantitative distance metric between the transformed predicted output signal and the predicted output signal;
    providing the transformed predicted output signal of the set of transformed predicted output signals that satisfy the constraint set, the transformed predicted output signal subsequently used as additional training data to iteratively improve future forecasting performance of the machine learning model;
    generating a new training dataset by incorporating the transformed predicted output signal as additional training data with the historical time series data;
    re-training the machine learning model using the new training dataset to generate an improved base forecasting model, wherein the re-training comprises providing the transformed predicted output signal and the constraint set as training inputs to the machine learning model, using the transformed predicted output signal that satisfies the constraint set as training data for future predictions and modifying the base forecasting model to incorporate patterns from the transformed predicted output signal such that subsequent predicted output signals generated by the improved base forecasting model exhibit constraint satisfaction patterns learned from the transformed predicted output signal.

20. The system of claim 1, wherein the heuristic algorithm comprises:

selecting a set of data points of the predicted output signal to modify;

selecting a set of new values for the set of data points;

modifying the set of data points using the set of new values;

determining whether the modified predicted output signal satisfies the constraints defined by the formal logical expressions; and repeating the selecting, modifying, and determining steps with different sets of data points and different sets of new values.

\* \* \* \* \*